US010469425B1

(12) United States Patent
Conley et al.

(10) Patent No.: US 10,469,425 B1
(45) Date of Patent: Nov. 5, 2019

(54) SECURE MESSAGE SERVICE FOR PREVENTING DISSEMINATION OF SENSITIVE INFORMATION TO THIRD-PARTIES

(71) Applicant: Amazon Technologies, Inc., Seattle, WA (US)

(72) Inventors: Myles Conley, Seattle, WA (US); Aaron Cop, Burnaby (CA)

(73) Assignee: Amazon Technologies, Inc., Seattle, WA (US)

( * ) Notice: Subject to any disclaimer, the term of this patent is extended or adjusted under 35 U.S.C. 154(b) by 100 days.

(21) Appl. No.: 15/375,003

(22) Filed: Dec. 9, 2016

(51) Int. Cl.
| *H04L 12/58* | (2006.01) |
| *H04L 29/08* | (2006.01) |
| *H04W 12/04* | (2009.01) |
| *H04L 9/08* | (2006.01) |
| *G06F 16/951* | (2019.01) |

(52) U.S. Cl.
CPC ........... *H04L 51/14* (2013.01); *G06F 16/951* (2019.01); *H04L 9/0816* (2013.01); *H04L 51/04* (2013.01); *H04L 51/12* (2013.01); *H04L 51/22* (2013.01); *H04L 67/20* (2013.01); *H04L 67/2804* (2013.01); *H04W 12/04* (2013.01)

(58) Field of Classification Search
CPC ................................. H04L 51/12; H04L 51/22
See application file for complete search history.

(56) References Cited

U.S. PATENT DOCUMENTS

| 5,577,040 | A | * | 11/1996 | Klumpp | H04M 11/02 370/487 |
| 7,620,691 | B1 | * | 11/2009 | Goldman | H04L 29/12594 709/204 |
| 8,453,040 | B2 | * | 5/2013 | Henderson, Jr. | G06F 11/10 341/51 |
| 8,539,224 | B2 | * | 9/2013 | Henderson | G06F 21/14 713/151 |
| 8,583,912 | B2 | * | 11/2013 | Ishikawa | H04L 9/0833 380/260 |
| 8,719,568 | B1 | * | 5/2014 | Antypas, III | H04L 9/14 713/168 |
| 2004/0189699 | A1 | * | 9/2004 | Dobronsky | G06F 3/1423 715/751 |
| 2005/0198170 | A1 | * | 9/2005 | LeMay | H04L 63/045 709/206 |

(Continued)

OTHER PUBLICATIONS

Klensin, "Simple Mail Transfer Protocol," Network Working Group, Request for Comments: 5321, Oct. 2008, 96 pages.

(Continued)

*Primary Examiner* — Lashonda T Jacobs
(74) *Attorney, Agent, or Firm* — Davis Wright Tremaine LLP

(57) ABSTRACT

A message relay service receives, from an electronic message service, an electronic message that includes obscured data that cannot be de-obscured by a third-party mass delivery service and an electronic address for the electronic message service. The message relay service de-obscures the obscured data to obtain plaintext data for inclusion in the electronic message. The message relay service replaces the electronic address for the electronic message service with an electronic address for a specified recipient and causes the electronic message including the plaintext data to be transmitted to the specified recipient.

20 Claims, 9 Drawing Sheets

(56) References Cited

U.S. PATENT DOCUMENTS

| | | | |
|---|---|---|---|
| 2006/0031328 A1* | 2/2006 | Malik | G06Q 10/107 709/206 |
| 2006/0053280 A1* | 3/2006 | Kittle | H04L 63/0428 713/156 |
| 2006/0155810 A1* | 7/2006 | Butcher | G06Q 10/107 709/206 |
| 2008/0165972 A1* | 7/2008 | Worthington | H04L 63/06 380/278 |
| 2010/0219154 A1* | 9/2010 | Mooney | B65D 1/0223 215/381 |
| 2011/0131279 A1* | 6/2011 | Karnik | H04L 51/32 709/206 |
| 2012/0023326 A1* | 1/2012 | Kalan | H04L 63/0428 713/156 |
| 2013/0007448 A1 | 1/2013 | Brown et al. | |
| 2013/0275532 A1* | 10/2013 | Shah | H04L 51/00 709/206 |
| 2014/0281493 A1* | 9/2014 | Nakhjiri | H04L 9/321 713/155 |
| 2014/0330910 A1* | 11/2014 | Anderson | H04L 51/04 709/206 |
| 2014/0337615 A1* | 11/2014 | Tomkow | H04L 63/0428 713/153 |
| 2015/0149775 A1* | 5/2015 | Gadotti | H04L 63/0464 713/168 |
| 2016/0248745 A1* | 8/2016 | Tsirkin | H04L 63/08 |
| 2016/0294750 A1* | 10/2016 | Ansari | G06F 3/0485 |
| 2017/0359314 A1* | 12/2017 | Mathias | H04L 63/0428 |
| 2017/0366478 A1* | 12/2017 | Mohammed | H04L 51/02 |

OTHER PUBLICATIONS

"Resnick, Internet Message Format," Network Working Group, Request for Comments: 5322, Oct. 2008, 58 pages.

Yao et al., "SMTP Extension for Internationalized Email," Internet Engineering Task Force, Request for Comments: 6531, Feb. 2012, 18 pages.

* cited by examiner

SECURE MESSAGE SERVICE FOR PREVENTING DISSEMINATION OF SENSITIVE INFORMATION TO THIRD-PARTIES

BACKGROUND

Companies and other organizations often rely on third-party mass delivery services to deliver electronic messages to its customers. However, these companies and other organizations may not trust these third-party mass delivery services with sensitive information that is to be sent to its customers. Further, regulatory requirements may prevent dissemination of sensitive information to third-parties, making it difficult to utilize third-party mass delivery services to transmit electronic messages that include such sensitive information to customers of these companies and organizations.

These companies and other organizations also often collaborate with other companies to generate electronic messages and other messages that may provide their customers with information that may be useful to these customers. However, these companies may be prohibited from sharing data directly with one another, making it difficult to collaborate in creating messages that include all the information needed by customers for their needs. Additionally, coordinating creation of these electronic messages may be difficult and time-intensive.

BRIEF DESCRIPTION OF THE DRAWINGS

Various techniques will be described with reference to the drawings, in which.

DETAILED DESCRIPTION

Figure 1:
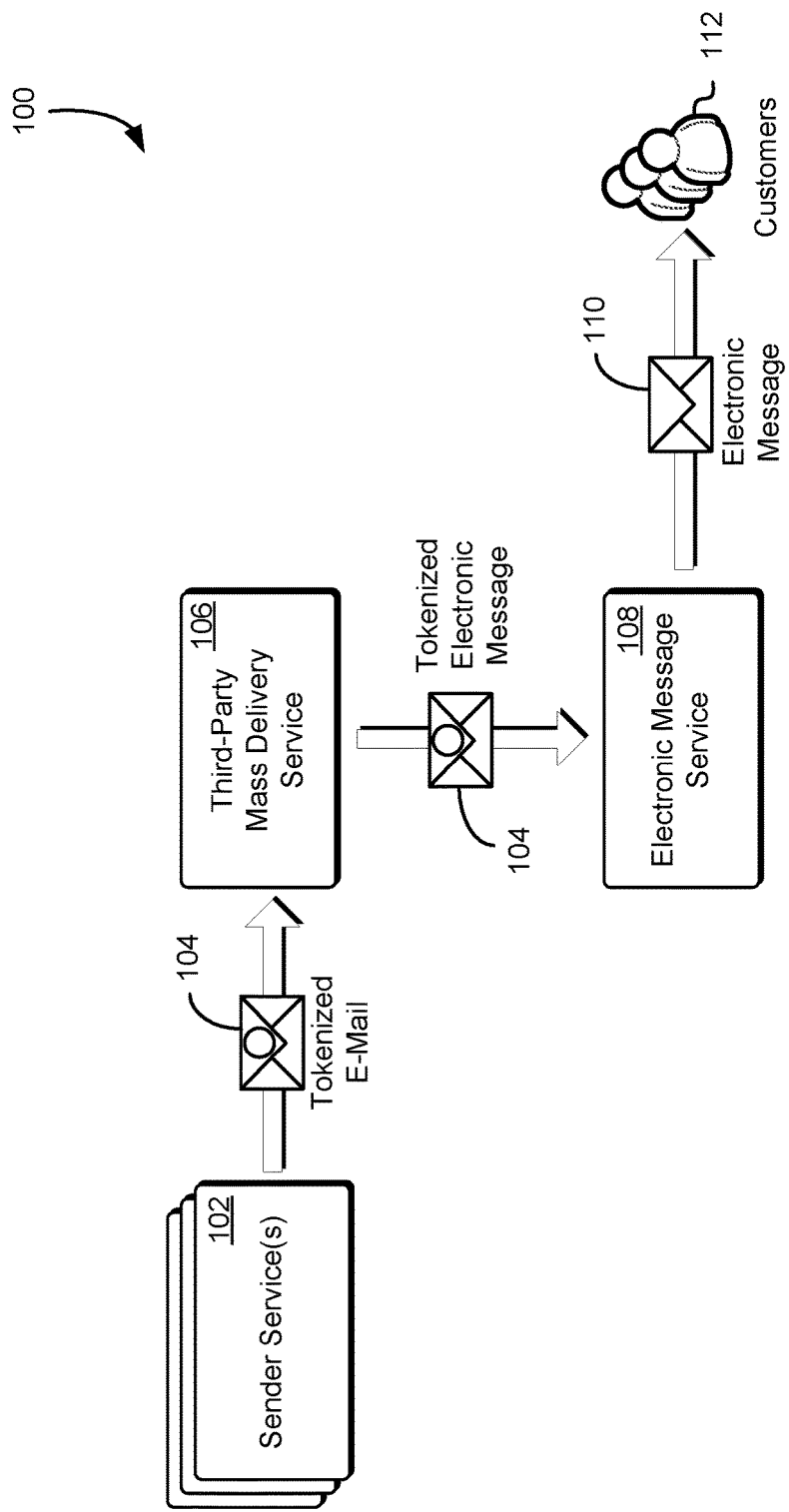
FIG. 1 shows an illustrative example of an environment in which various embodiments can be implemented.

This patent application relates to a message relay service that receives tokenized electronic mail messages, decodes obscured fields of the tokenized electronic mail messages, and routes the electronic mail messages to a new destination according to metadata stored in the obscured fields. In an example, an organization wanting to send an electronic message to a variety of customers creates a token for each customer's electronic message address. The token may include an anonymous identifier that is specific to a third-party mass delivery service and is in the form of another electronic message address that corresponds to an electronic message service that the organization may trust with sensitive information or with routing to another service that can handle sensitive information on the organization's behalf. Additionally, if the electronic message to be delivered to the variety of customers includes sensitive information that the organization does not want to expose to the third-party mass delivery service, the organization may obfuscate any fields within the electronic message that include sensitive information with another token. This token may include encrypted data in a form that includes metadata that may be used for decryption. Alternatively, this token may include a workflow data element that may specify a lookup number or an Extensible Markup Language (XML) object that may include instructions or other parameters for de-obscuring any obscured fields in the electronic message.

In response to receiving the tokenized electronic messages from the organization, the third-party mass delivery service may transmit, based on the anonymous identifier specified in the tokenized electronic message, the tokenized electronic messages to the electronic message service. The electronic mail message may forward these tokenized electronic messages to a message relay service, which may parse each tokenized electronic message to identify any obscured elements in the tokenized electronic message. In an example, for each obscured field in the tokenized electronic message, the message relay service determines whether it is able to de-obscure the obscured fields itself or if another service is required to de-obscure any of the identified fields. If the message relay service determines that it can de-obscure any of the obscured fields in the tokenized electronic message, the message relay service may perform various operations to de-obscure these fields. In some examples, if the tokenized electronic message includes a lookup number or XML object, the message relay service may utilize the lookup number or XML object to identify any instructions or parameters that may specify how to de-obscure any obscured fields in the tokenized electronic message. The methods for de-obscuring any obscured fields in the tokenized electronic message may include transmitting the tokenized electronic message to another service to enable the other service to insert the sensitive information that is to be included in the electronic message or identifying the cryptographic key or algorithm that can be used to decrypt an obscured portion of the tokenized electronic message.

If the message relay service is unable to de-obscure all the obscured fields within a tokenized electronic message, the message relay service may forward the tokenized electronic message to a service that can de-obscure any remaining obscured fields. This service may provide the tokenized electronic message back to the message relay service, which may use the anonymous identifier in the electronic message to identify the customer's actual electronic message address for delivery of the electronic message to the customer. In some examples, the message relay service invokes various data loss prevention (DLP) rules to ensure that any disallowed elements, including any obscured fields, are not present in the electronic message prior to delivery to the customer. If there are any remaining obscured fields in the electronic message, the message relay service may de-obscure these fields or forward the electronic message to another service that can de-obscure these remaining obscured fields.

In an example, the message relay service can forward the electronic message via a Simple Mail Transfer Protocol (SMTP) server, such as through the electronic message service, to the customer's electronic message address. Alternatively, if the recipient utilizes a different communications protocol, the message relay service may forward the electronic message to a non-SMTP gateway or service based on the protocol utilized by the recipient. As the electronic messages are delivered to the customers by the electronic message service or other service based on the communications protocol utilized by the customer, the electronic message service or other service may confirm delivery of the electronic messages to the third-party mass delivery service, which may track delivery of the electronic messages and provide the organization with confirmation that the electronic messages were delivered successfully.

In this manner, an organization may transmit electronic messages to its customers without exposing sensitive information to the third-party mass delivery service or to any other unauthorized entity. In addition, the techniques described and suggested in this disclosure enable additional technical advantages. For instance, because the tokenized electronic message may include a lookup number or XML object to identify any instructions or parameters that may specify how to de-obscure any obscured fields in the tokenized electronic message, a message relay service may use these instructions or parameters to pass the tokenized electronic message to different services that may de-obscure different fields of the electronic message without exposing sensitive information among these different services. Thus, the message relay service may merge content from other services without exposing content to unauthorized services while maintaining the anonymity of the recipient.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 shows an illustrative example of an environment 100 in which various embodiments can be implemented. In the environment 100, a sender service 102 transmits one or more tokenized electronic messages 104 to a third-party mass delivery service 106 for delivery to one or more customers 112 of the sender service 102. The sender service 102 may include one or more computing systems that may provide organizations and other users of the sender service 102 with resources for generating and distributing electronic messages on their behalf. For instance, the sender service 102 may be utilized by an organization or other entity to transmit electronic messages to its customers. The customers 112 may be individuals, groups of individuals, or other organizations that may be associated with the organization utilizing the sender service 102. For example, a customer 112 may be a purchaser of an item furnished by the organization, whereby the organization may periodically transmit tailored electronic messages that may be specific to the customer 112 (e.g., includes telemetry data for the customer's item, customer identifiers, customer purchase history, etc.).

In an embodiment, a sender service 102 generates one or more electronic messages that are to be delivered to one or more customers 112. An electronic message may include an electronic address for the intended recipient. This electronic message address may include an identifier for the name of an electronic mailbox, which may be the username of the recipient that is to receive the electronic message. Additionally, the electronic message address may specify a domain name that represents an administrative realm for the mailbox. This may correspond to the electronic message service or server utilized by the recipient to access its electronic messages. The organization utilizing the sender service 102 to deliver the one or more electronic messages to its customers 112 may provide, to the sender service 102, the electronic message addresses to be utilized for delivery of the electronic messages to the corresponding customers 112. The organization may provide the electronic messages to the sender service 102 or may utilize the sender service 102 to generate the electronic messages that are to be transmitted to the various customers 112 of the organization. Electronic messages that may be used include: electronic mail messages, Short Message Service (SMS) messages, Multimedia Messaging Service (MMS) messages, text messages, and other forms of messages that may be delivered electronically.

To deliver the one or more electronic messages to the customers 112, the sender service 102 may utilize a third-party mass delivery service 106. The third-party mass delivery service 106 may be a customer relationship management (CRM) service capable of routing and escalating events defined by its customers. For instance, an organization, through the sender service 102, may utilize the third-party mass delivery service 106 for transmitting electronic messages to customers of the organization as part of an event (e.g., warranty information distribution, product recalls, etc.) and to track dissemination of these electronic messages on behalf of the organization. In some instances, the organization may not want to expose its customers' contact information (e.g., electronic message addresses, physical addresses, etc.) or any other sensitive information to the third-party mass deliver service 106. For example, if the organization wants to disseminate personal medical information to a particular customer, regulatory restrictions may exist preventing dissemination of this personal medical information to a third-party, such as the third-party mass delivery service 106. Alternatively, the organization may prefer to prevent the third-party mass delivery service 106 from obtaining customer information.

In an embodiment, in order to prevent dissemination of sensitive information to the third-party mass delivery service 106, the sender service 102 replaces plaintext data from the electronic message with encrypted data in a form that includes metadata that may be used for decryption of the encrypted data. This metadata may specify the name of the cryptographic key or cryptographic algorithm that may be used to decrypt the encrypted data. This cryptographic key or algorithm may be available to another service utilized by the organization, such as a token conversion service or decryption service described in greater detail in relation with FIG. 3. Thus, if a token conversion service or decryption service receives the electronic message comprising an obscured field that specifies encrypted data, the token conversion service or decryption service may use the metadata specified in the electronic message to determine which cryptographic key or algorithm to use to decrypt the obscured field.

In some embodiments, the sender service generates a workflow data element that is added to the electronic message. The workflow data element may include a lookup number that may be used by a message relay service to identify any operations that are to be performed to de-obscure any obscured elements of the electronic message. For instance, if the electronic message includes encrypted data, the lookup number may refer the message relay service to one or more instructions or parameters that may cause the message relay service to transmit the electronic message to a token conversion service or decryption service for decryption of the encrypted data. The instructions or parameters may be provided to the message relay service by the organization or may be encoded by the message relay service in a database, whereby the encoded instructions or parameters may be associated with a particular lookup number that is provided to the organization. The organization may provide this lookup number to the sender service 102, which may include the lookup number in the electronic message. The workflow data element may alternatively include an XML object or other code expressed in a programmatic language that may specify the one or more instructions or parameters that can be used by the message relay service. For instance, the message relay service may parse the electronic message to identify the XML object. If the message relay service identifies an XML object in the electronic message, the message relay service may use the XML object to identify any other tokens in the electronic message and to determine where to route these tokens for resolution. The XML object may also include credential information that the message relay service may use to access the sender service to obtain a digital certificate, shared secret, or other token sufficient for verifying that the obscured field is authentic and that the plaintext data of the obscured field can be disseminated to the next recipient of the electronic message.

Based at least in part on the organization's preferences for preventing dissemination of sensitive information to the third-party mass delivery service 106, the sender service 102 may obscure one or more fields of the electronic message to create a tokenized electronic message 104. The tokenized electronic message 104 may include one or more tokens that may obscure the sensitive information in the electronic message. Each of the one or more tokens may include encrypted data, XML objects, lookup numbers, or other information that may not be decipherable by the third-party mass delivery service 106 to obtain the sensitive information. In an embodiment, the sender service 102 substitutes a token for the electronic message address of the customer to whom the electronic message is addressed. This token may be formatted in a similar fashion to a standard electronic message address except that the electronic message may be addressed to an electronic message service 108 associated with the organization that generated the original electronic message.

The electronic message service 108 may include one or more SMTP servers or other mail servers that may facilitate routing and delivery of electronic messages to customers 112, other services, or other entities based at least in part on the address specified in the electronic message. In an embodiment, the third-party mass delivery service 106 evaluates the delivery token specified in the tokenized electronic message 104 to determine that the tokenized electronic message 104 is addressed to the electronic message service 108. The third-party mass delivery service 106 may transmit the tokenized electronic message 104 to the electronic message service 108, which may store the tokenized electronic message 104 or place the tokenized electronic message 104 in a queue for processing. Alternatively, based at least in part on the delivery token specified in the tokenized electronic message 104, the electronic message service 108 may transmit the tokenized electronic message 104 to a message relay service or other service that can parse the tokenized electronic message 104.

In response to receiving the tokenized electronic message 104 from the electronic message service 108, from the queue, or from a datastore used to store the tokenized electronic message 104, the message relay service may parse the data in the tokenized electronic message 104 to identify any tokenized or encrypted fields within the tokenized electronic message 104. For instance, the message relay service may evaluate the tokenized electronic message 104 for any metadata indicating presence of an obscured field within the tokenized electronic message 104 that is to be de-obscured by the message relay service. Based at least in part on the tokens identified in the tokenized electronic message 104, the message relay service may identify any tokens that can be de-obscured by the message relay service.

If the message relay service is unable to de-obscure a token within the tokenized electronic message 104, the message relay service may identify a remote service that may be capable of de-obscuring the token. For instance, the token may specify, in its metadata, the tools required to de-obscure the token. This may include the name of a cryptographic key utilized for encryption of obscured field, the name of a service that is authorized to de-obscure the obscured field, instructions for transmitting the obscured field to another service, and the like. Based at least in part on this metadata for a token in the tokenized electronic message 104, the message relay service may transmit the tokenized electronic message 104 to another service that is capable of de-obscuring the obscured field in the tokenized electronic message 104. Once the other service has de-obscured any remaining tokens in the tokenized electronic message 104, the other service may query the message relay service by providing the token representing the recipient's address to the message relay service. In response to the query, the message relay service may provide an electronic message address corresponding to the intended recipient. This may cause the other service, through its own gateway, to deliver the electronic message 110 to the intended recipient.

In some embodiments, if the message relay service is able to de-obscure the tokens in a tokenized electronic message 104, the message relay service will replace the token representing the recipient's address with the actual recipient's address. The message relay service may forward the message via the electronic message service 108 to the recipient's address specified in the electronic message 110. In this manner, the customers 112 of the organization utilizing the sender service 102 may receive the full electronic message 110 from the electronic message service 108. In an embodiment, the electronic message service 108 tracks delivery of the electronic messages 110 to the customers 112 to determine whether each electronic message 110 is delivered successfully. Confirmation of delivery of the electronic messages 110 may be transmitted by the electronic message service 108 to the third-party mass delivery service 106, which may track success of the delivery of the electronic messages 110 to the customers 112. The third-party mass delivery service 106 may provide this information to the organization, which may use the information to determine the success of its campaign to deliver these electronic messages 110. In some instances, if the electronic message is not delivered successfully, the electronic message service 108 transmits delivery state information to the third-party mass delivery service indicating that the electronic message was not delivered successfully. Thus, the electronic message service may provide delivery state information to the third-party mass delivery service based at least in part on the result of attempting to deliver the electronic message to the specified recipient.

The message relay service may also evaluate the recipient's address or instructions provided in the electronic message to determine whether the electronic message is to transmit the electronic message using an alternative transport mechanism. For example, if the electronic message includes one or more parameters that indicate that a different transport mechanism is to be used for transmitting the electronic message to the next recipient, the message relay service may change the format of the electronic message such that the different transport mechanism may be used to transmit the electronic message to the next recipient.

In an embodiment, if the electronic message is not delivered successfully, the electronic message service obscures or redacts any de-obscured field in the electronic message and provides the electronic message to the third-party mass delivery service. The electronic message service may utilize the techniques originally utilized to obscure the de-obscured fields such that the sender service may obtain the tokenized electronic message in its original form. For instance, if the electronic message service de-obscured a field to obtain plaintext that cannot be disseminated to an entity that provided the electronic message to the electronic message service, the electronic message service may obscure this field according to the methods utilized by the sender service to obscure the field. Thus, if the electronic message is delivered to the entity as part of a routing chain back to the sender service, the plaintext will be unattainable by this entity.

Figure 2:
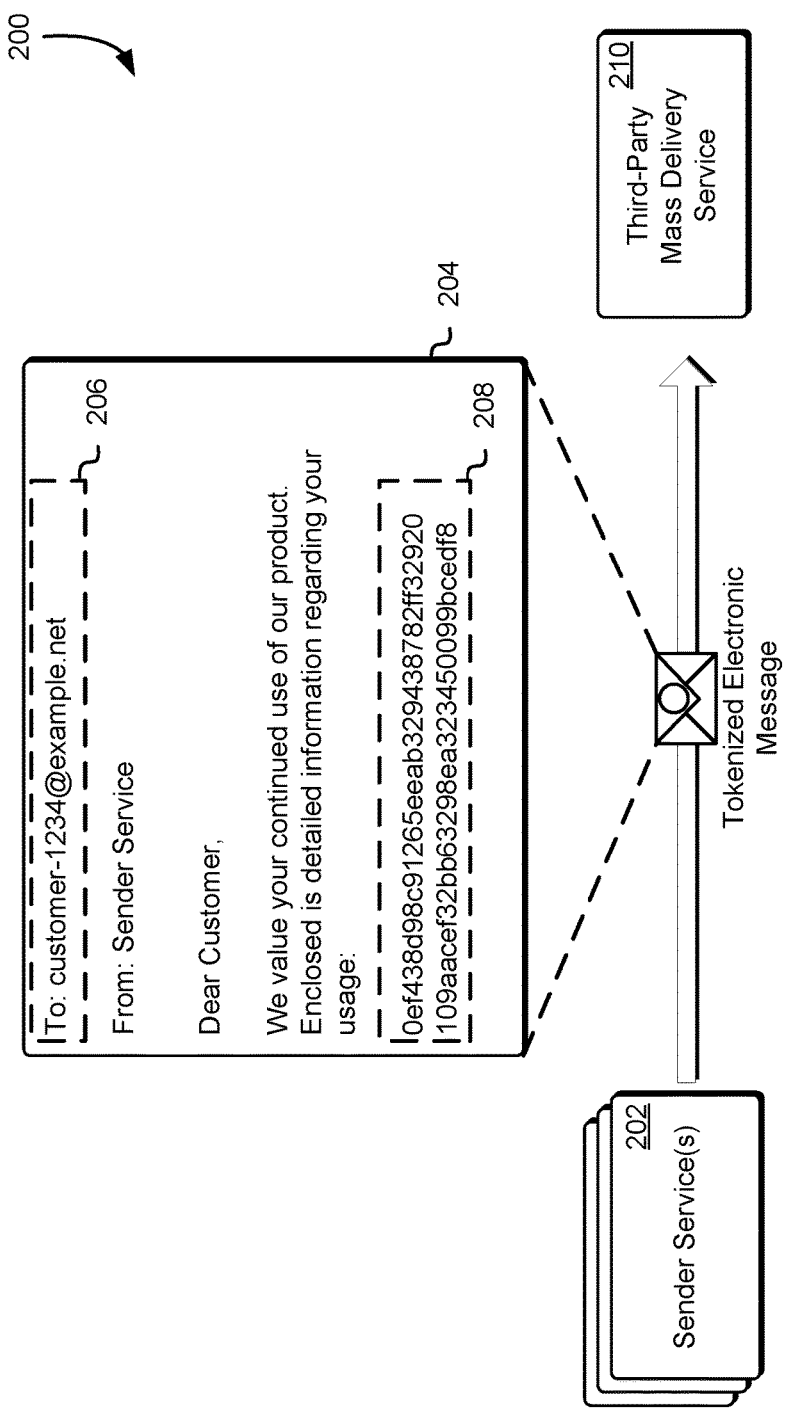
FIG. 2 shows an illustrative example of an environment in which one or more fields in an electronic message are obscured to generate a tokenized electronic message transmitted to a third-party mass delivery service in accordance with at least one embodiment.

As noted above, an organization, through a sender service, may obscure one or more fields in an electronic message that is to be transmitted to a customer prior to utilizing a third-party mass delivery service for delivery of the electronic message. For instance, the organization may want to prevent inadvertent dissemination of sensitive information to the third-party mass delivery service or to other entities that may not be authorized to access the sensitive information. Accordingly, FIG. 2 shows an illustrative example of an environment 200 in which one or more fields in an electronic mail message are obscured to generate a tokenized electronic mail message 204 transmitted to a third-party mass delivery service 210 in accordance with at least one embodiment.

In the environment 200, a sender service 202 may generate various e-mails on behalf of an organization for delivery to a variety of customers of the organization. These e-mails may include material that may be pertinent to the organization's customers, such as information regarding promotional deals, warranty information for products purchased by the customers, coupons, rebates, and the like. In some instances, the organization may provide, in each electronic message, personal information for each customer. For example, the organization may want to include personal usage information for a product purchased by a customer, medical information subject to one or more regulations, personally identifiable information (e.g., Social Security numbers, driver's license numbers, etc.), and the like. The organization may not want to disseminate or otherwise expose this personal information to the third-party mass delivery service 210.

In an embodiment, the sender service 202 identifies one or more fields of an electronic message that includes sensitive information and obscures these one or more fields to generate a body token 208 within the electronic message. To identify the one or more fields that are to be tokenized, the sender service 202 may receive input from the organization, which may specify what information in the electronic message is to be obscured. For instance, the sender service 202 may provide the organization with an interface for generating the electronic message. Through the interface, the organization may specify the portions of the electronic message that include sensitive information that cannot be discoverable by the third-party mass delivery service 210. The organization may further specify a method for obscuring the selected fields of the electronic message to generate the body token 208. For example, the organization may replace plaintext data in the selected fields of the electronic message with encrypted data. This encrypted data may include metadata that may be used to determine a method for decryption of the encrypted data. The metadata may specify a name of a cryptographic key used for encryption of the plaintext data, an algorithm utilized to encrypt the plaintext data, and the like.

The organization may alternatively include, as a body token 208 in the electronic message, a workflow data element, which may include a lookup number usable to identify one or more instructions or an XML object comprising these one or more instructions. The instructions in the workflow data element may cause a message relay service associated with the organization or sender service 202 to identify other tokens present in the tokenized electronic message 204 that is transmitted via the third-party mass delivery service 210. Additionally, the instructions in the workflow data element may cause the message relay service to route these tokens to other services that may de-obscure these tokens. These other services may provide, in place of a token, information that is to be provided to the customer but may not be disseminated to other entities, such as the third-party mass delivery service 210. Additionally, these other services may have the cryptographic keys available to decrypt the encrypted data specified in a particular body token 208 of the tokenized electronic message 204. The instructions included in the workflow data element or retrieved using the lookup number specified in the workflow data element may include specific rules for de-obscuring a body token 208 in the tokenized electronic message 204. For example, a specific rule may specify that if the recipient is not a particular entity specified in the rule, the entity is to provide the tokenized electronic message 204 to a specific electronic address specified in the tokenized electronic message 204 for de-obscuring of one or more body tokens 208. Alternatively, if the entity receiving the tokenized electronic message 204 is specified in the rule, the entity may perform various operations to de-obscure the one or more body tokens 208. Thus, the workflow data element may be used to provide complex rules for de-obscuring body tokens 208 and for routing the body tokens 208 or the tokenized electronic message 204 to other services for de-obscuring of the body tokens 208.

In some embodiments, the body token 208 includes another service's tokens or encrypted data in order to maintain the secrecy of data from these other services. The sender service 202 may include, in the tokenized electronic message 204 a workflow data element that may direct the message relay service to instructions for delivering this particular body token 208 to the other service for de-obscuring of the tokens or encrypted data specified in the body token 208. For instance, a message relay service may utilize the workflow data element to identify the body token 208 and determine that the obscured data in the body token 208 can be de-obscured by another service as specified in the workflow data element. This may cause the message relay service to transmit this body token 208 to the specified service.

The data that is provided in the tokenized electronic message 204 may be tokenized by the end customer that is to receive the electronic message. For instance, the customer may provide data to the organization or sender service 202 in encrypted form such that the data may not be discoverable by the organization or the sender service 202. The customer may specify, in the metadata for the encrypted data, that certain entities are authorized to decrypt the encrypted data provided by the customer. In some instances, the customer may utilize an inverted tokenization transform such that all data that is not part of the body token 208 is obscured. Alternatively, the customer may map the tokens into a non-SMTP service or into a different transport service. This may enable delivery of the tokenized electronic message 204 to the customer or other entity and enable the customer or other entity to decrypt the encrypted data in the tokenized electronic message 204 without disseminating this information to the sender service 202 or the third-party mass delivery service 210.

In an embodiment, the sender service 202 substitutes an electronic message address token 206 for the true electronic message address of the intended recipient (e.g., customer) of the electronic message. The electronic message address token 206 may be formatted using a general format of an electronic message address, including the name of a mailbox and a domain name. The electronic message address token 206 may be subject to a protocol such as SMTP, as defined in Request For Comments (RFC) 5321, RFC 5322, and RFC 6531. The electronic message address token 206 may be generated by the sender service 202 on behalf of the organization sending the electronic message to a customer. While electronic message addresses are used extensively throughout the present disclosure for the purpose of illustration, the electronic message address token 206 can be formatted using any contact address that may be used to deliver the tokenized electronic message 204 to a particular recipient. For instance, the electronic message address token 206 may specify an Internet Protocol (IP) address, a Uniform Resource Identifier (URI), a user handle or name within a particular service, and the like. The electronic message address token 206 may specify an address for the organization's servers or for an electronic message service associated with the organization for processing of tokenized electronic messages 204 on its behalf.

The sender service 202 may transmit the tokenized electronic message 204 to a third-party mass delivery service 210 for delivery. In response to receiving the tokenized electronic message 204 from the sender service 202, the third-party mass delivery service 210 may evaluate the electronic message address token 206 to determine where to deliver the tokenized electronic message 204. For instance, because the electronic message address token 206 may specify a contact address for another service, the third-party mass delivery service 210 may transmit the tokenized electronic message 204 to this other service for processing. Based at least in part on the electronic message address token 206 specified in the tokenized electronic message 204, the tokenized electronic message 204 may be delivered to the organization's servers, such as an SMTP mail server or an electronic message service, as designated by the organization to the sender service 202.

Figure 3:
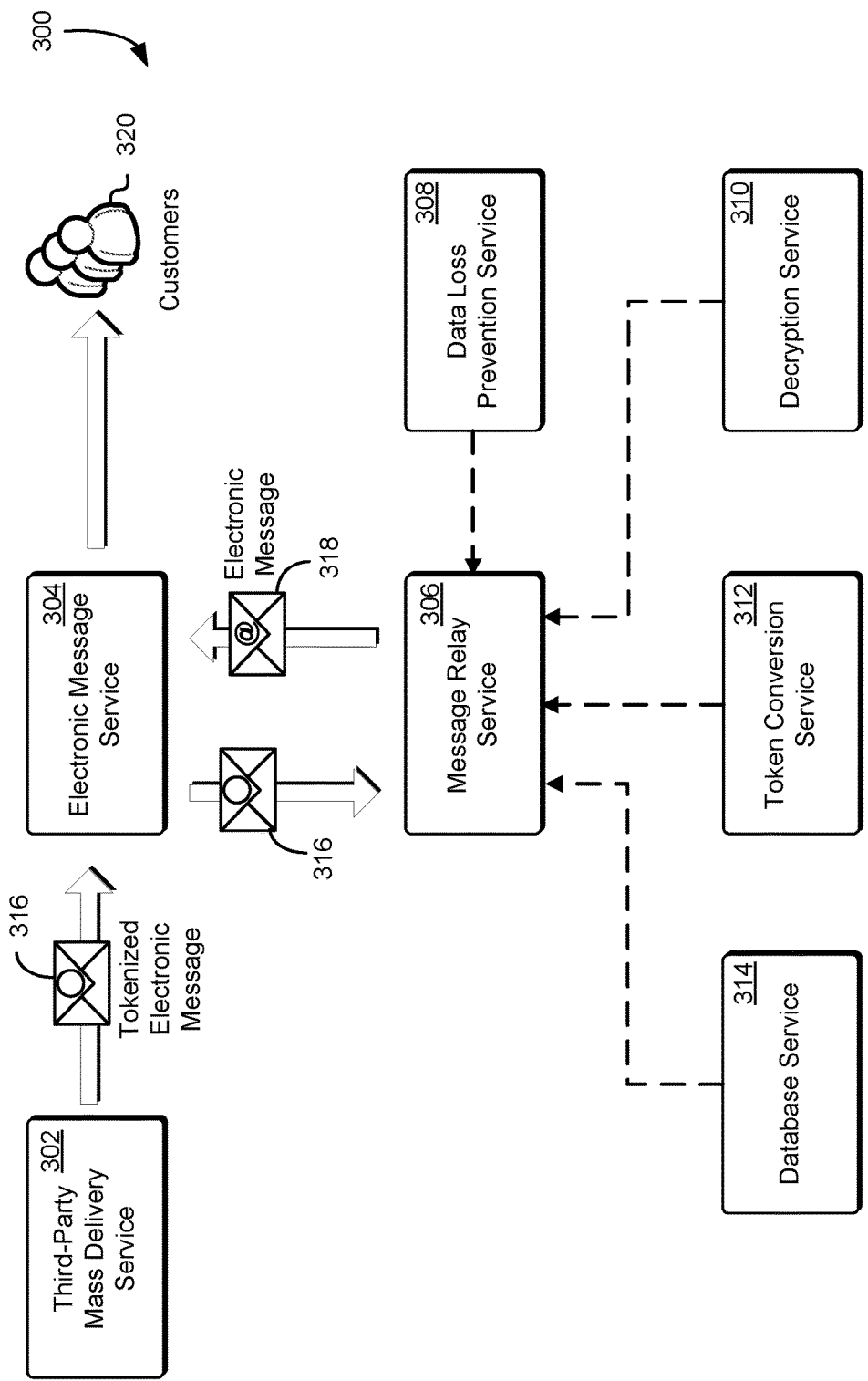
FIG. 3 shows an illustrative example of an environment in which an electronic message service transmits a tokenized electronic message to a message relay service for de-obscuring any obscured fields within the tokenized electronic message in accordance with at least one embodiment.

As noted above, the third-party mass delivery service may transmit a tokenized electronic message to an organization's servers or to an electronic message service based at least in part on the contact address specified in an electronic message address token of the tokenized electronic message. For instance, the tokenized electronic message may include an electronic message address token that may specify a contact address for an electronic message service utilized by the organization for the processing of tokenized electronic messages. This electronic message service may provide the tokenized electronic messages to a message relay service to de-obscure any obscured fields in the tokenized electronic messages and to prepare the electronic messages for delivery to customers of the organization. Accordingly, FIG. 3 shows an illustrative example of an environment 300 in which an electronic message service 304 transmits a tokenized electronic mail message 316 to a message relay service 306 for de-obscuring of any obscured fields within the tokenized electronic mail message 316 in accordance with at least one embodiment.

In the environment 300, a third-party mass delivery service 302 may evaluate a tokenized electronic message 316 provided by a sender service or an organization delivering electronic messages to its customers 320 to determine whether the tokenized electronic message 316 includes a contact address for a recipient of the tokenized electronic message 316. For example, the tokenized electronic message 316 may include an electronic message address token that may specify an electronic message address, an IP address, a URI, a user handle or name within a particular service, and the like. The electronic message address token may specify an address for the organization's servers or for an electronic message service 304 associated with the organization for processing of tokenized electronic messages on its behalf. Thus, the third-party mass delivery service 302 may utilize the electronic message address token to transmit the tokenized electronic message 316 to the electronic message service 304 or to the organization's servers for processing.

In response to receiving a tokenized electronic message 316 from the third-party mass delivery service 302, the electronic message service 304 may forward the tokenized electronic message 316 to a message relay service 306 that may process the tokenized or obscured fields of the tokenized electronic message 316. Alternatively, the electronic message service 304 may store the tokenized electronic message 316 in a datastore accessible by the message relay service 306. This may enable the message relay service 306 to query the datastore to determine whether there are any new tokenized electronic messages 316 that are to be processed by the message relay service 306. In some embodiments, the electronic message service 304 adds the received tokenized electronic message 316 to a queue that is accessible by the message relay service 306. The message relay service 306 may obtain the tokenized electronic message 316 from the queue for processing.

The message relay service 306 may be provided by a service provider utilized by the organization for de-obscuring tokenized electronic messages 316 transmitted by the organization through a sender service. Through the message relay service 306, the organization may provide data that may be inserted in place of an obscured or tokenized field of the tokenized electronic message 316. For instance, the organization may update a database of the message relay service 306 to associate metadata of a tokenized field of the tokenized electronic message 316 with plaintext data that may be inserted in place of the tokenized field in the tokenized electronic message 316. Alternatively, the organization may provide a cryptographic key or other information that may be used to derive a cryptographic key for the decryption of encrypted fields in the tokenized electronic message 316. An organization may also specify one or more services that may be used by the message relay service 306 to de-obscure any tokenized fields in the tokenized electronic message 316, as described in greater detail below.

The message relay service 306 may parse through the data included in the tokenized electronic message 316 obtained from the electronic message service 304 to identify the tokenized or encrypted fields. For each tokenized or encrypted field identified in the tokenized electronic message 316, the message relay service 306 may determine whether it is able to de-obscure these fields. For example, if an encrypted field includes metadata specifying an identifier of a cryptographic key utilized to encrypt data in the field, the message relay service 306 may determine whether it has a cryptographic key or access to an algorithm usable to decrypt the encrypted field. Alternatively, if the tokenized electronic message 316 includes a workflow data element that includes a lookup number, the message relay service 306 may utilize the lookup number to identify, from a database, one or more instructions provided by the organization or the sender service for processing the tokenized fields in the tokenized electronic message 316. These instructions, if executed by the message relay service 306, may cause the message relay service 306 to de-obscure the tokenized fields in the tokenized electronic message 316.

In some embodiments, the message relay service 306 transmits one or more tokenized fields from the tokenized electronic message 316 to one or more services that may de-obscure these fields. For instance, the tokenized electronic message 316 may include a workflow data element comprising one or more instructions that may cause the message relay service 306 to detect certain tokenized fields in the tokenized electronic message 316 that are to be delivered to another service. Alternatively, the metadata for a tokenized field may specify an address or an identifier for another service that is capable of de-obscuring the tokenized field. In some instances, the message relay service 306 may evaluate a tokenized field and determine that it cannot de-obscure the field. The message relay service 306 may query a service provider to identify a service provided by the service provider that is capable of de-obscuring the tokenized field.

If the message relay service 306 is able to de-obscure one or more tokenized fields of the tokenized electronic message 316, the message relay service 306 may transmit a request to a data loss prevention service 308 to obtain one or more data loss prevention rules that may be used to determine if the tokenized electronic message 316 includes any disallowed elements. The data loss prevention service 308 may comprise one or more databases that specify, for each organization, one or more data loss prevention rules for prohibited content for electronic messages. For instance, the data loss prevention service 308 may provide a rule to the message relay service 306 indicating that no electronic message from a particular organization can include encrypted data when delivered to its customers 320. Thus, the message relay service 306 may evaluate a tokenized electronic message 316 to determine whether the tokenized electronic message 316 includes encrypted data. If the tokenized electronic message 316 includes encrypted data, the message relay service 306 may attempt to decrypt the field or identify a service that can decrypt the field on its behalf. Alternatively, a rule may specify that certain data is to be redacted. If the tokenized electronic message 316 includes such data, the message relay service 306 may redact this data from the message.

In some embodiments, the data loss prevention service 308 also evaluates the de-obscured fields in the tokenized electronic message 316 to determine whether the de-obscured fields satisfy one or more quality control constraints imposed by the sender service or other entity that maintains the message relay service 306. For instance, the data loss prevention service 308 may evaluate the de-obscured fields to determine whether any of these fields include profanity, disparaging content, libelous content, malware or spyware, and any other offensive material that is not suitable for dissemination to customers 320. If the data loss prevention service 308 determines that any of the de-obscured fields in the tokenized electronic message 316 do not satisfy the quality control constraints, the data loss prevention service 308 may perform one or more operations to address the issue. This may include modifying the de-obscured field to remove the offending material, contacting the sender service or organization that generated the content to provide a replacement for the offending material, or causing the message relay service 306 to prevent delivery of the electronic message 318 to the specified recipient. In some instances, the data loss prevention service 308 may prevent the sender service, the organization, and/or the third-party mass delivery service 302 from being able to provide tokenized electronic messages to the message relay service 306 until any identified issues are resolved by the sender service, the organization, and/or the third-party mass delivery service 302.

The message relay service 306 may also utilize a decryption service 310 provided by a service provider utilized by the organization for decryption of one or more encrypted fields in the tokenized electronic message 316. The decryption service 310 may comprise computer systems that may utilize cryptographic keys or cryptographic algorithms for decrypting data provided to the decryption service 310 from myriad sources. Additionally, the decryption service 310 may serve as a repository for an organization's cryptographic keys. For instance, an organization may interact with a decryption service 310 to define a cryptographic key pair that may be used for encryption of data that is to be included in a tokenized electronic message 316. Alternatively, the organization may provide a cryptographic key to the decryption service 310 for decryption of encrypted fields in a tokenized electronic message 316. As described above, an encrypted field of the tokenized electronic message 316 may include metadata that specifies an identifier for a cryptographic key that was used to encrypt the field. The metadata may also specify an address for the decryption service 310. The message relay service 306 may transmit the tokenized electronic message 316 or the data in the encrypted field to the decryption service 310 for decryption of the encrypted data specified in the encrypted field. The decryption service 310 may provide the decrypted field or the tokenized electronic message 316 with the decrypted field to the message relay service 306 for additional processing. Alternatively, the decryption service 310 may query the message relay service 306 to identify the customer's contact address and may transmit the electronic message to the customer through an SMTP gateway, such as the electronic message service 304 or other mail service utilized by the decryption service 310.

In some instances, the message relay service 306 may utilize a token conversion service 312 provided by a service provider utilized by the organization for the de-obscuring of tokens included in the tokenized electronic message 316. The token conversion service 312 may comprise computer systems that may include one or more databases specifying data that can be provided in place of tokens specified in a tokenized electronic message 316. The token conversion service 312 may thus serve as a key-value store for sensitive information, whereby token identifiers may correspond to particular sensitive information or other information that may be provided in an electronic message to customers 320 of the organization. Additionally, the token conversion service 312 may include databases with key-value pairs for lookup numbers and instructions for the processing of tokens in the tokenized electronic message 316. If the message relay service 306 transmits a token from the tokenized electronic message 316 to the token conversion service 312, the token conversion service 312 may evaluate the token to identify an identifier for the token. This may include the aforementioned lookup number or other identifier that may be used to identify a key-value pair within its databases. The token conversion service 312 may query these databases to identify the sensitive information or instructions for processing the received token. If the token conversion service 312 identifies sensitive information associated with the provided token, the token conversion service 312 may transmit the sensitive information to the message relay service 306 for inclusion in the electronic message. In some instances, if the token conversion service 312 determines that the sensitive information cannot be provided to the message relay service 306 (e.g., the organization does not want to expose the information to the message relay service 306, etc.), the token conversion service 312 may transmit a request to the message relay service 306 to provide the tokenized electronic message 316 once the other fields of the tokenized electronic message 316 have been de-obscured. The token conversion service 312 may replace the token with the sensitive information and transmit the electronic message 318 to the customer through its own electronic message service or other private gateway.

The message relay service 306 may utilize a database service 314 of the service provider or of the organization to translate any electronic message address tokens specified in the tokenized electronic message 316 into the actual contact address for the customer 320 that is to receive the electronic message 318. The database service 314 may include one or more computer systems and datastores that maintain one or more databases that comprise key-value pairs corresponding to electronic message address tokens and contact addresses for customers 320 and other targeted recipients of electronic messages. In response to receiving an electronic message address token from the message relay service 306, the database service 314 may query the one or more databases to determine whether there is a key-value pair corresponding to the provided electronic message address token. If a key-value pair is identified, the database service 314 may identify the corresponding contact address for the intended customer or other recipient and provide this contact address to the message relay service 306. The message relay service 306 may substitute the electronic message address token in the tokenized electronic message 316 for the received contact address to de-obscure the tokenized electronic message 316, resulting in the de-obscured electronic message 318. In some embodiments, the message relay service 306 provides the tokenized electronic message 316 to the database service 314 once the obscured tokens included in the body of the tokenized electronic message 316 have been de-obscured. The database service 314 may de-obscure the electronic message address token to obtain the actual contact address for the customer or other recipient and may utilize the electronic message service 304 or other private gateway (e.g., the database service 314 is associated with a different service provider, such as the organization's own service provider or other authorized service provider) to deliver the electronic message 318 to the intended recipient.

It should be noted that while the message relay service 306 may rely on the aforementioned services for de-obscuring the various obscured tokens presented in the tokenized electronic message 316, the message relay service 306 may be capable of de-obscuring any tokens in the tokenized electronic message 316 using additional, fewer, or alternative services. For instance, the message relay service 306 may have the functionality of the aforementioned services to de-obscure the tokens itself. Alternatively, the tokens specified in the tokenized electronic message 316 may not be of the type which would cause the message relay service 306 to transmit the token to a particular service for de-obscuring. If the message relay service 306 determines that the tokenized electronic message has been de-obscured, resulting in the electronic message 318, the message relay service 306 may transmit the electronic message 318 to the electronic message service 304 for delivery to the customer 320 or other recipient whose contact address is specified therein. In some embodiments, the message relay service 306 transmits the electronic message 318 to the customer 320 without utilizing the electronic message service 304. For instance, the message relay service 306 may utilize its own SMTP server or gateway for delivery of the electronic message 318 to the customer 320.

In some embodiments, the electronic message service 304 tracks delivery of the electronic message 318 to the customer 320 to confirm delivery of the electronic message 318. For instance, the electronic message service 304 may receive confirmation from a customer's SMTP server or other server indicating successful delivery of the transmitted electronic message 318. The electronic message service 304 may transmit these confirmations to the third-party mass delivery service 302, which may track the success of delivery of the electronic messages 318 to the customers 320. The third-party mass delivery service 302 may provide statistics regarding the success of delivery of these electronic messages 318 to the organization or sender service, which may utilize this information to determine whether more electronic message deliveries need to occur, perform any operations to address any issues encountered in the delivery of the electronic messages 318, and the like.

Figure 4:
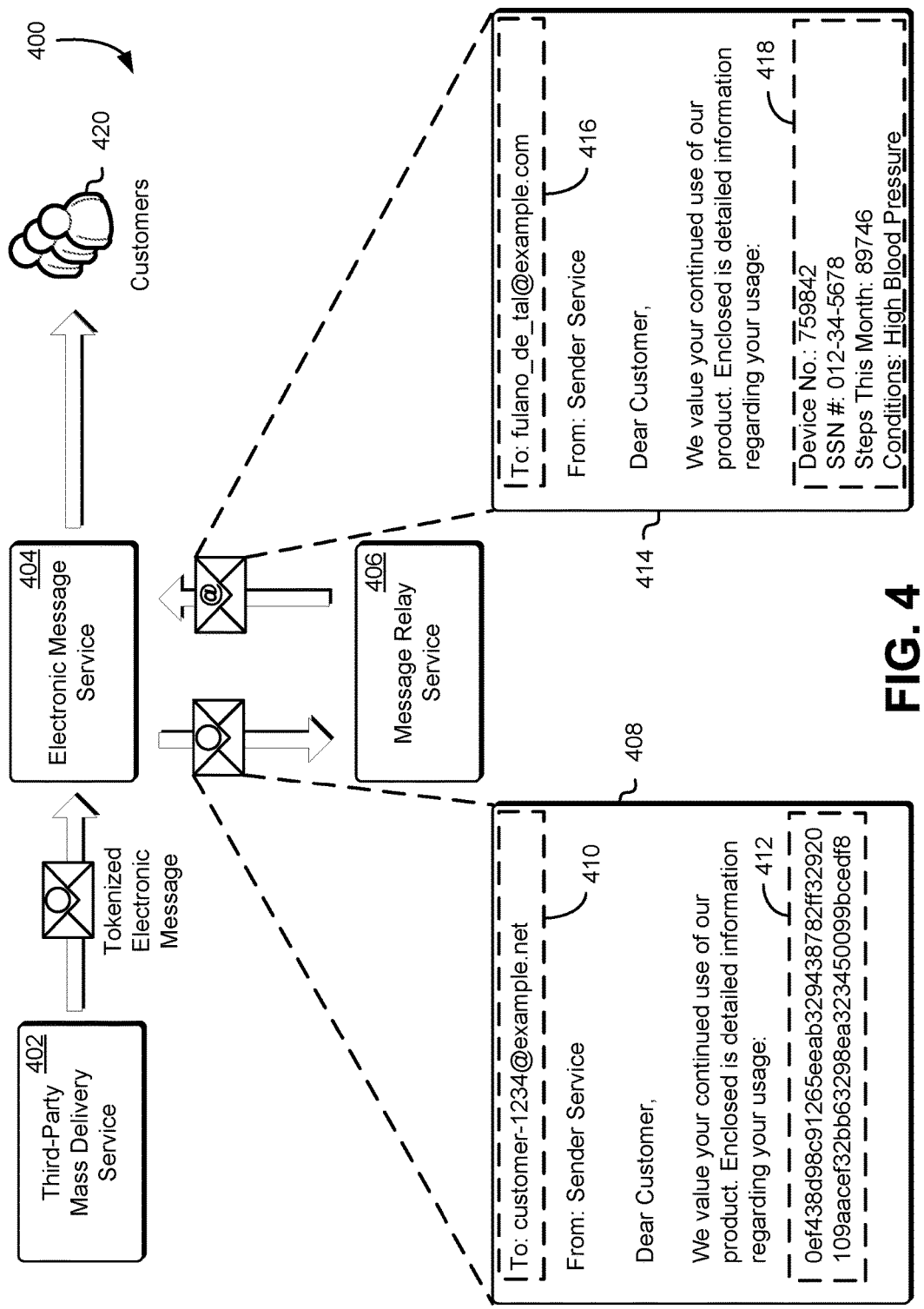
FIG. 4 shows an illustrative example of an environment in which one or more obscured fields in an electronic message are de-obscured for delivery to customers in accordance with at least one embodiment.

As noted above, a message relay service may receive a tokenized electronic message from an electronic message service for de-obscuring of one or more tokens presented in the tokenized electronic message. The message relay service may utilize one or more processes or other services for de-obscuring these tokens, resulting in plaintext data in the electronic message that can be provided to an intended recipient of the electronic message. Accordingly, FIG. 4 shows an illustrative example of an environment 400 in which one or more obscured fields 410, 412 in a tokenized electronic message 408 are de-obscured for delivery to customers 420 in accordance with at least one embodiment.

The environment 400 may be similar to the environment 300 illustrated in FIG. 3 and described above. For instance, the third-party mass delivery service 402 may transmit a tokenized electronic message 408 to an electronic message service 404 based at least in part on an electronic message address token specified in the tokenized electronic message 408. The electronic message service 404 may transmit the tokenized electronic message 408 to the message relay service 406 for de-obscuring the one or more obscured fields 410, 412 of the tokenized electronic message 408.

The tokenized electronic message 408 may include an electronic message address token 410 and one or more body tokens 412 as defined by the organization or sender service that generated the tokenized electronic message 408. The electronic message address token 410 may be formatted using a general format of an electronic message address, including the name of a mailbox and a domain name. The electronic message address token 410 may be subject to a protocol such as SMTP. The electronic message address token 410 may be generated by the sender service on behalf of the organization sending the electronic message to a customer. The electronic message address token 410 may specify an address for the organization's servers or for an electronic message service 404 associated with the organization for processing of tokenized electronic messages 408 on its behalf.

The one or more body tokens 412 included in the tokenized electronic message 408 may include an anonymous identifier for a customer's contact address that may be specific to a particular partner, such as the third-party mass delivery service 402 or other service. The one or more body tokens 412 may also include encrypted data in a form that includes metadata that may be used to identify a method of decryption. The metadata may specify an identifier of a cryptographic key or algorithm utilized for encryption, as well as an address or identifier of a service that is to perform decryption of the body token 412. Additionally or alternatively, the one or more body tokens 412 may include a workflow data element that includes a lookup number usable to identify one or more instructions for obtaining data to be included in the electronic message or an object generated using a programmatic language (e.g., XML, etc.) that may include the one or more executable instructions. These instructions may be used by the message relay service 406 to identify other body tokens 412 in the tokenized electronic message 408 and where to route these body tokens 412 for resolution. In some embodiments, if the tokenized electronic message 408 does not include a workflow data element, the message relay service 406 will utilize its own processes or other standard services associated with the message relay service 406 to de-obscure the body tokens 412.

In response to receiving the tokenized electronic message 408 from the electronic message service 404, the message relay service 406 may parse through the tokenized electronic message 408 to identify any workflow data elements. If the message relay service 406 identifies one or more workflow data elements, the message relay service 406 may utilize these workflow data elements to identify any body tokens 412 included in the tokenized electronic message 408. Alternatively, if the tokenized electronic message 408 does not include at least one workflow data element, the message relay service 406 may identify the body tokens 412 itself without additional input or instruction. For each body token 412 identified, the message relay service 406 may determine whether it is able to de-obscure the body token 412. If it cannot do so, the message relay service 406 may identify another service that may de-obscure the body token 412 and transmit the body token 412 to the identified service. In some instances, the message relay service 406 may de-obscure any body tokens 412 it has identified prior to sending the tokenized electronic message 408 to another service for de-obscuring any remaining body tokens. The other service may de-obscure any remaining body tokens and transmit the electronic message address token 410 to the message relay service 406 for de-obscuring. The message relay service 406 may provide the actual contact address for the intended recipient, which may enable the other service to transmit the electronic message 414 through its own gateway or server to the customer 420.

If the message relay service 406 is able to de-obscure the body tokens 412 in the tokenized electronic message 408 or receives the de-obscured data 418 from the one or more services utilized to de-obscure the body tokens 412, the message relay service 406 may de-obscure the electronic message address token 410 to obtain the actual recipient contact address 416 for the customer that is to receive the electronic message 414. The message relay service 406 may forward the electronic message 414 via the electronic message service 404 or other SMTP mail server to the contact address 416 specified in the electronic message 414. Alternatively, if the contact address 416 does not follow the SMTP format, the message relay service 406 may forward the electronic message 414 to a non-SMTP gateway or service, based at least in part on the format of the contact address 416. In this manner, the previously tokenized electronic message 408 may arrive to the customer 420 in a de-obscured format.

Figure 5:
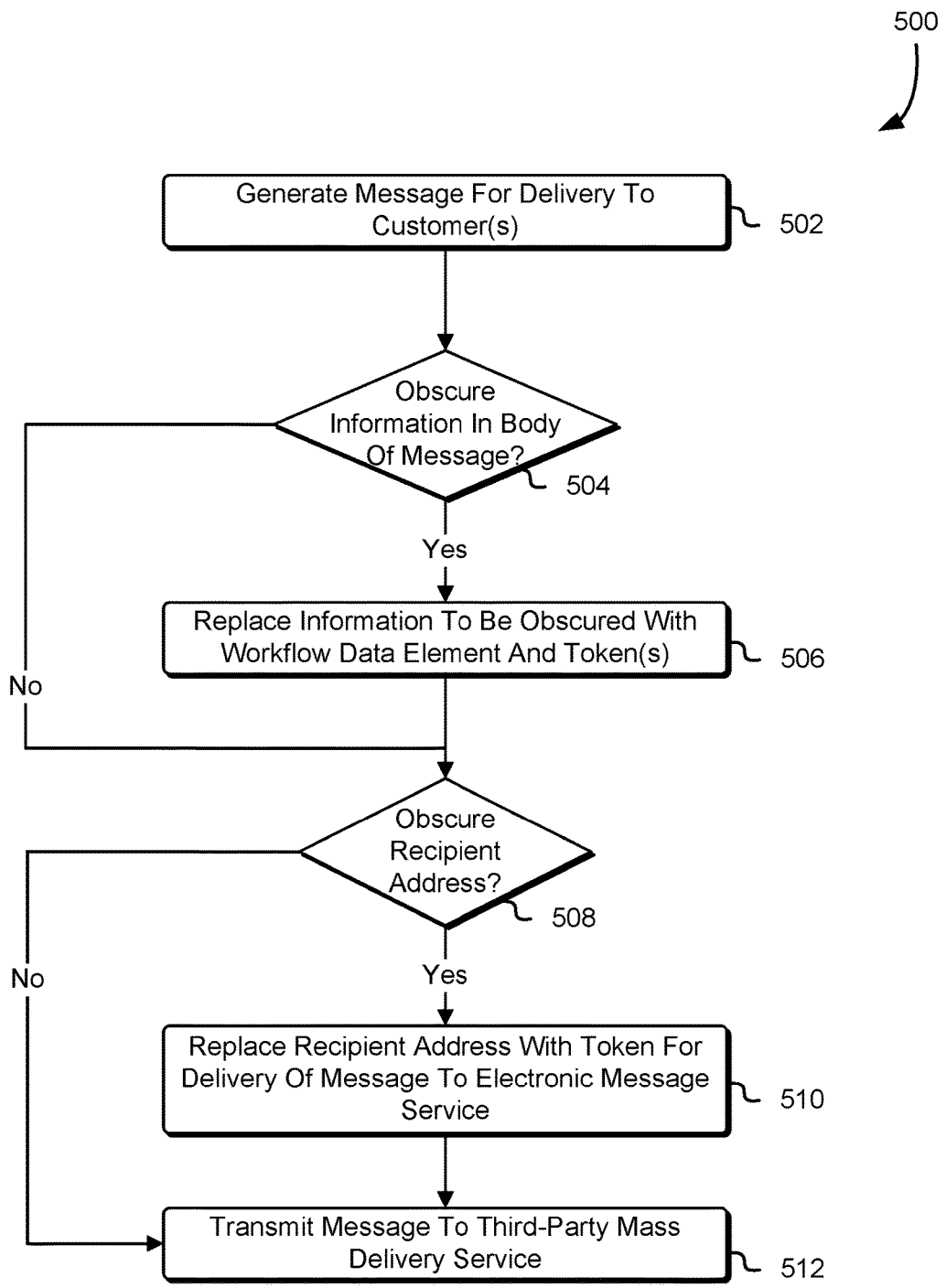
FIG. 5 shows an illustrative example of a process for obscuring one or more fields of an electronic message for transmittal to a third-party mass delivery service in accordance with at least one embodiment.

As noted above, an organization or sender service operating on behalf of an organization may generate an electronic message for delivery to its customers. The organization may not want to expose sensitive information that is to be included in the electronic message to a third-party service, which may be delivering the electronic message on its behalf or otherwise tracking delivery of the electronic message to the intended recipient. As a result, the organization or the sender service may obscure one or more fields of the electronic message to prevent dissemination of sensitive information to the third-party service. Accordingly, FIG. 5 shows an illustrative example of a process 500 for obscuring one or more fields of an electronic mail message for transmittal to a third-party mass delivery service in accordance with at least one embodiment. The process 500 may be performed by a sender service or other computing system or service utilized by an organization for delivery of electronic messages to its customers.

At any time, a sender service may receive a request from an organization to generate an electronic message for delivery to a particular recipient. The organization may provide the electronic address for the recipient, as well as information that is to be included in the electronic message. For example, the sender service may provide the organization with an interface through which an organization may input the electronic address for the intended recipient and the information that is to be included in the electronic message. In response to the request from the organization, the sender service may generate 502 the electronic message for delivery to one or more customers of the organization or to other recipients as indicated via the electronic address provided.

The sender service may evaluate the generated message to determine 504 whether to obscure any information in the body of the electronic message. For instance, through the interface, an organization may specify one or more fields in the message that are to be obscured to prevent dissemination of the data in these fields to third parties. For example, the organization can provide encrypted data that is to be included in the electronic message or select a cryptographic key that can be used by the sender service to encrypt the one or more fields in the message selected by the organization. Alternatively, the organization may specify one or more operations for obscuring the selected one or more fields in the message, which the sender service may perform to obscure the one or more fields. Thus, if the sender service determines that information within the electronic message is to be obscured, the sender service may replace 506 this information with one or more body tokens and workflow data elements that may be used by a message relay service associated with the organization for de-obscuring these one or more body tokens.

If the sender service determines that no portions of the electronic message are to be obscured or the sender service obscures the specified information in the body of the electronic message, the sender service may determine 508 whether to obscure a recipient address specified in the electronic message. For instance, the organization may provide electronic message address tokens that may be used to replace the actual electronic message addresses for the intended recipients. These tokens may be formatted to mimic the format of the electronic message addresses for the intended recipients. For instance, the token may utilize a SMTP format to enable delivery of the electronic message to an SMTP server specified in the domain of the token. Alternatively, the organization, through the sender service, may specify an address for an electronic message service or message relay service that may process the electronic message. The sender service may obscure the recipient address in the electronic message with a token that specifies the address of the electronic message service or message relay service specified by the organization. Thus, if the sender service determines that the recipient address is to be obscured using a token, the sender service may replace 510 the recipient address with the token to enable delivery of the electronic message to an electronic mail message specified in the token.

The sender service may transmit 512 the electronic message to a third-party mass delivery service for dissemination. If the electronic message does not include any obscured elements, the third-party mass delivery service may transmit the message to the intended recipient, as indicated via the recipient's electronic address provided by the organization. This particular electronic message may not have any obscured information, which may cause the third-party mass delivery service to evaluate any data within the electronic message. If information within the electronic message is obscured, the third-party mass delivery service may be unable to evaluate the data that has been obscured by the sender service. If the sender service replaces the recipient's electronic address with a token indicating an electronic address for an electronic message service or of a message relay service, the third-party mass delivery service may transmit the electronic message to the electronic message service or the message relay service.

Figure 6:
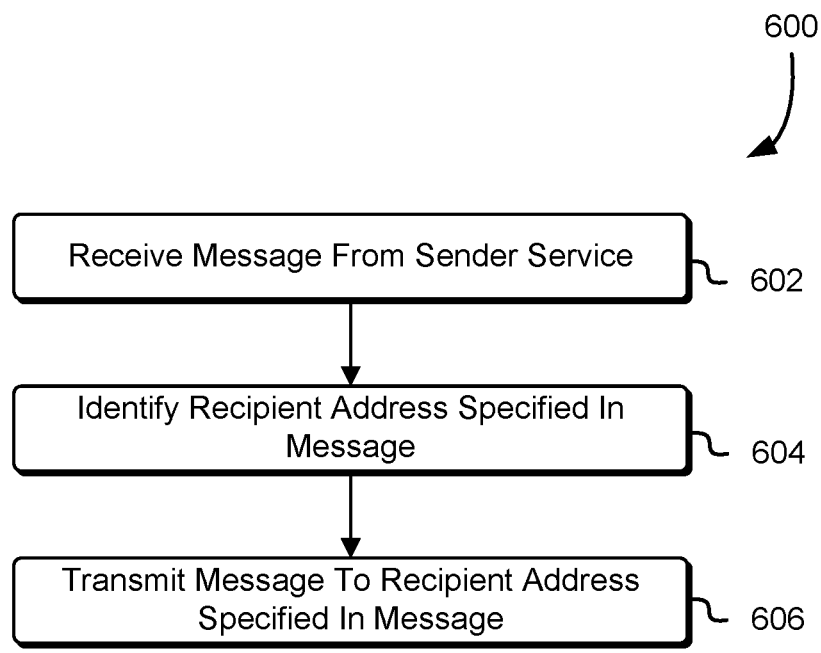
FIG. 6 shows an illustrative example of a process for transmitting an electronic message to an address specified in the electronic message in accordance with at least one embodiment.

As noted above, an organization may utilize a third-party mass delivery service for delivery of one or more electronic messages to various recipients. These electronic messages may include sensitive information that the organization does not want disseminated to the third-party mass delivery service. Thus, the organization, through a sender service, may obscure one or more elements of the electronic messages to prevent dissemination of the sensitive information to the third-party mass delivery service. Further, the organization, through the sender service, may obscure the recipient's address with a token indicating an electronic address of an electronic message service or message relay service that may coordinate with other services trusted by the organization for de-obscuring the obscured elements of the electronic messages. Accordingly, FIG. 6 shows an illustrative example of a process 600 for transmitting an electronic mail message to an address specified in the electronic mail message in accordance with at least one embodiment. The process 600 may be performed by a third-party mass delivery service or other delivery service that may forward electronic messages according to the electronic addresses specified in the messages.

The third-party mass delivery service may receive 602 an electronic message from a sender service that is to be delivered to an entity corresponding to an electronic address specified in the electronic message. This electronic address may include an identifier for the name of an electronic mailbox, which may be the username of the recipient that is to receive the electronic message. Additionally, the electronic address may specify a domain name that represents an administrative realm for the mailbox. This may correspond to the electronic message service or server utilized by the recipient to access its electronic messages. The organization utilizing the sender service to deliver the one or more electronic messages to its customers may provide, to the sender service, the electronic addresses to be utilized for delivery of the electronic messages to the corresponding customers. The organization may provide the electronic messages to the sender service or may utilize the sender service to generate the electronic messages that are to be transmitted to the various customers of the organization.

In response to receiving an electronic message from the sender service, the third-party mass delivery service may identify 604 the recipient address specified in the electronic message. The recipient address may include an electronic address of the customer that is to receive the electronic message from the organization. Alternatively, the recipient address may correspond to an electronic address token provided by the sender service that may cause the third-party mass delivery service to redirect the electronic message to an electronic message service or message relay service authorized by the organization to process the electronic message in order to de-obscure one or more obscured fields in the electronic message. Based at least in part on the recipient address specified in the electronic message, the third-party mass delivery service may transmit 606 the electronic message to a customer, to an electronic message service, or to a message relay service.

Figure 7:
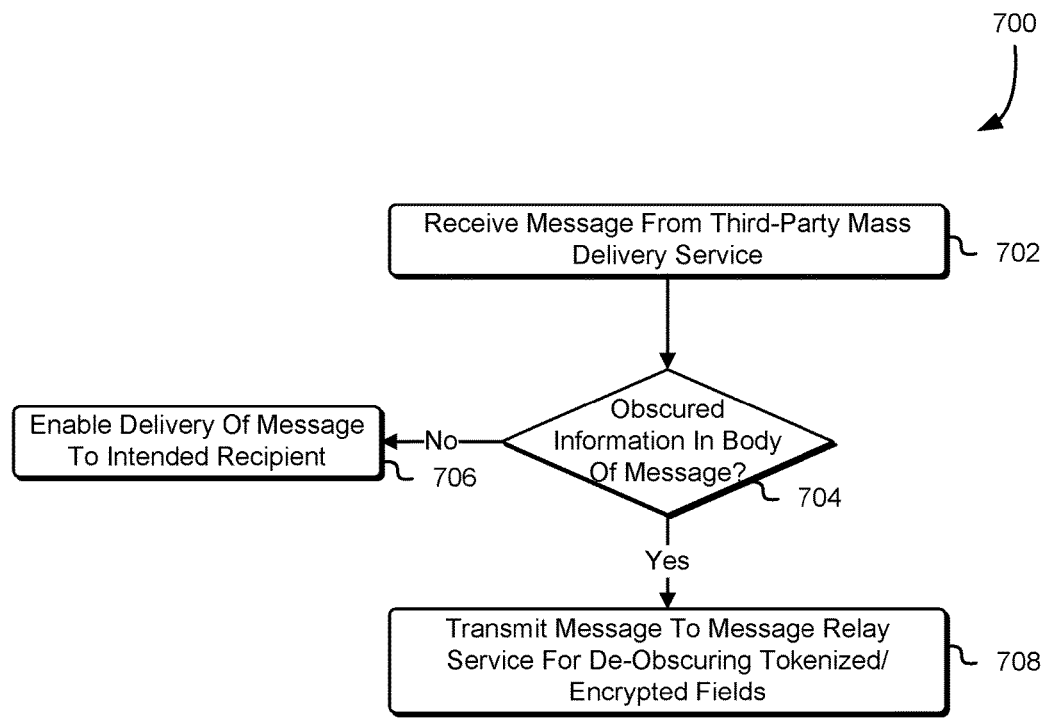
FIG. 7 shows an illustrative example of a process for transmitting a tokenized electronic message to a message relay service for de-obscuring one or more obscured fields in accordance with at least one embodiment.

As noted above, the third-party mass delivery service may transmit an electronic message to an electronic message service if the electronic address specified in a tokenized electronic message specifies that the message is to be delivered to the electronic message service. In response to receiving the electronic message from the third-party mass delivery service, the electronic message service may evaluate the electronic message to determine if it has any obscured fields. Based at least in part on this evaluation, the electronic message service may provide the electronic message service for the de-obscuring of any obscured fields. Accordingly, FIG. 7 shows an illustrative example of a process 700 for transmitting a tokenized electronic mail message to a message relay service for de-obscuring one or more obscured fields in accordance with at least one embodiment. The process 700 may be performed by the aforementioned electronic message service, which may be trusted by the organization sending the electronic messages to interact with a message relay service for de-obscuring any obscured fields of the electronic message and for delivery of the electronic message to the intended recipient according to the electronic address de-obscured from the electronic address token specified therein.

At any time, the electronic message service may receive 702 an electronic message from a third-party mass delivery service. The electronic message may include an electronic address token that may serve as a substitute for an actual electronic address for a customer or other intended recipient of the electronic message. The electronic message may also include one or more obscured fields in the body of the electronic message, comprising encrypted data or other indicator for obscured data. Additionally, the electronic message may include a workflow data element comprising a lookup number of other object created utilizing a programmatic code and including instructions for identifying the obscured fields and for de-obscuring these fields. Thus, the electronic message service may evaluate the received electronic message to determine 704 whether the electronic message includes obscured information or fields in the body of the electronic message. For instance, the electronic message service may evaluate the electronic message to determine whether the electronic message includes a workflow data element that can be used to identify any obscured elements in the electronic message. Alternatively, the electronic message service may evaluate metadata corresponding to any fields in the electronic message to determine whether any of these fields include obscured data.

If the electronic message does not include any obscured information in the body of the message, the electronic message service may enable 706 delivery of the electronic mail message to the intended recipient. For instance, the electronic message service may access a database comprising information provided by the organization or the sender service that may be used to identify the electronic address of the intended recipient based at least in part on the electronic address token specified in the electronic message. The electronic message service may obtain the electronic address for the intended recipient from the database by using the provided electronic address token in a query to the database. The electronic message service may substitute the token for the actual recipient electronic address and transmit the electronic message to the recipient. In some embodiments, the electronic message service transmits the electronic message to a message relay service, which may perform the operations described above for obtaining the actual recipient electronic address.

If the electronic message does include obscured information in the body of the message, the electronic message service may transmit 708 the electronic message to a message relay service for de-obscuring of the obscured information. As described above, the obscured information may be presented in the form of encrypted data that includes metadata usable to determine a method for decryption of the data. Alternatively, the obscured information may specify instructions that may cause the message relay service to obtain sensitive information that can be inserted into the electronic message in place of the obscured field in the electronic message or to transmit the token to another service that may include the sensitive information.

Figure 8:
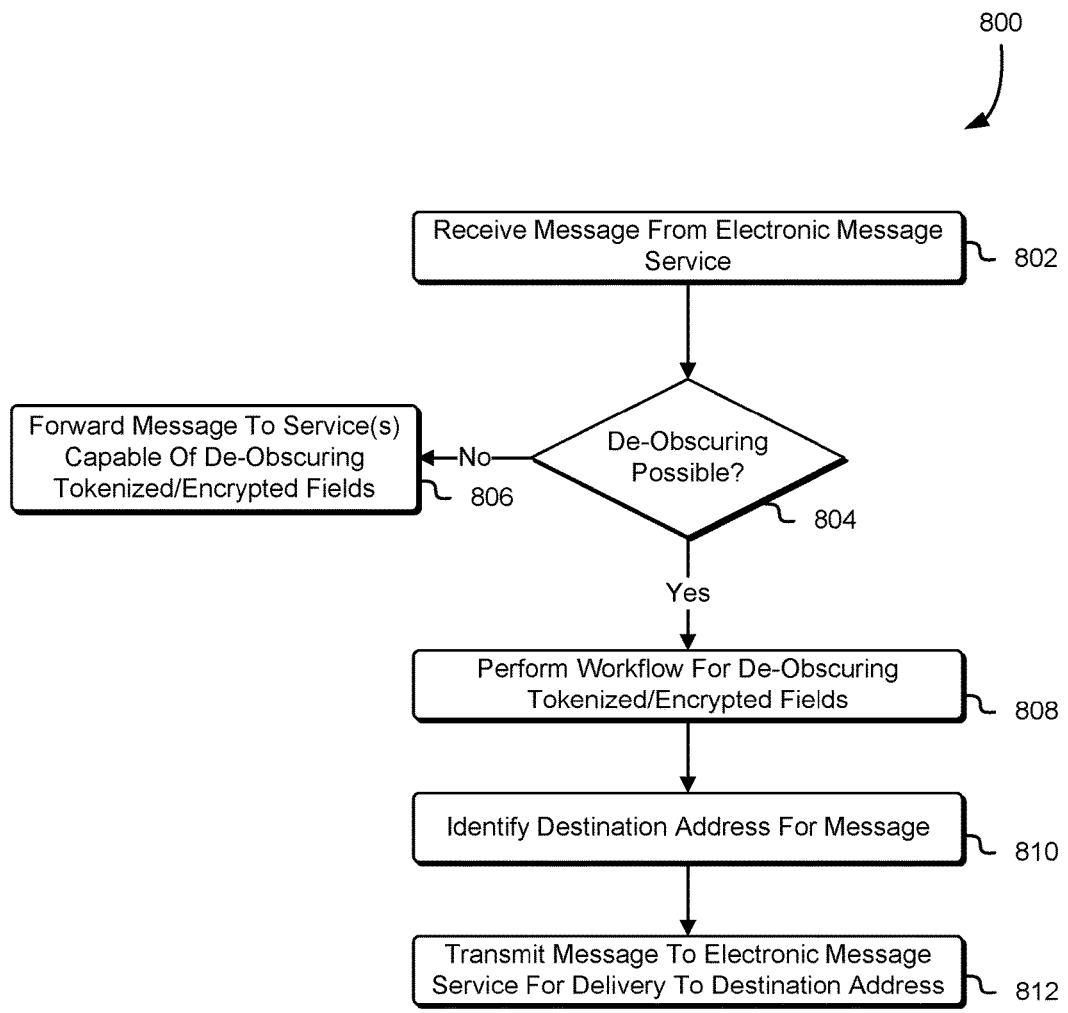
FIG. 8 shows an illustrative example of a process for de-obscuring one or more obscured fields of a tokenized electronic message and transmitting the electronic message to a destination address in accordance with at least one embodiment.

As described above, the electronic message service may transmit an electronic message that includes one or more tokens or other obscured information to a message relay service entrusted by the organization or sender service to de-obscure any tokens or obscured information in the electronic message and to provide the de-obscured electronic message to the electronic message service for delivery. The message relay service may de-obscure any obscured information or tokens in the electronic message that it is capable of de-obscuring. Otherwise, the message relay service may provide any tokens or obscured fields of the electronic message to other services that may be able to do so. Accordingly, FIG. 8 shows an illustrative example of a process 800 for de-obscuring one or more obscured fields of a tokenized electronic mail message and transmitting the electronic mail message to a destination address in accordance with at least one embodiment. The process 800 may be performed by the message relay service, which may receive electronic messages from the electronic message service and may de-obscure tokenized fields of an electronic message or provide the tokenized fields to one or more services that may de-obscure these fields. Additionally, the message relay service may provide the de-tokenized electronic message to the electronic message service for delivery to the intended recipient.

An electronic message service may receive an electronic message from a third-party mass delivery service. This electronic message may include one or more obscured fields in the body of the electronic message that are to be de-obscured before delivery to another recipient. In order to de-obscure these fields, the electronic message service may transmit the electronic message to the message relay service entrusted by the organization or sender service that generated the electronic message with de-obscuring the obscured fields in the body of the electronic message. Thus, the message relay service may receive 802 the electronic message from the electronic message service.

In response to receiving the electronic message from the electronic message service, the message relay service may evaluate the electronic message to determine 804 whether it can de-obscure the one or more obscured fields in the electronic message. For instance, the message relay service may identify a workflow data element in the electronic message that can be used to identify one or more instructions for identifying the obscured fields of the electronic message and the operations to be performed to de-obscure these fields. In some instances, these operations may include forwarding the obscured fields to another service that is capable of de-obscuring the obscured fields. Additionally, or alternatively, the electronic message may include one or more encrypted fields having metadata that indicates an identifier for a cryptographic key or algorithm used to encrypt the data in the fields. The message relay service may determine if it has access to the cryptographic key or algorithm for decrypting these fields. If it does not have access, it may review the metadata to identify a service that may have the cryptographic key or algorithm for decrypting these fields. Thus, if the message relay service determines that it cannot de-obscure any of the obscured fields in the electronic message, the message relay service may forward 806 the electronic message to one or more services that are capable of de-obscuring these tokenized or encrypted fields of the electronic message.

In some embodiments, the message relay service identifies an obscured field that includes a digital signature of the sender service. This obscured field may specify an ordering for delivery of the electronic message to other recipients for de-obscuring any other obscured fields in the electronic message. Generally, the field may specify (or have an associated value that specifies) an entity for de-obscuring the field. A valid digital signature of the field and/or associated value(s) may be used to indicate authorization to transmit to the specified entity for de-obfuscation. The message relay service may verify that the digital signature is valid to determine whether the electronic message may be transmitted to another recipient for de-obscuring of additional obscured fields in the electronic message and that this other recipient is authorized to inspect the plaintext data obtained by the message relay service.

The message relay service may use the public cryptographic key to verify the digital signature to determine that the obscured field is authentic and that the message relay service is authorized to de-obscure the obscured field. Further, the message relay service may verify that the next entity to receive the electronic message is authorized to view the plaintext data of the obscured field. For instance, if the electronic message is to be delivered to another service that is to de-obscure a different obscured field in the electronic message, the message relay service may determine whether this other service is authorized to view the plaintext data that is obtained by the message relay service through de-obscuring of the obscured field. If so, the message relay service may de-obscure the obscured field. Otherwise, the message relay service may transmit the electronic message or the different obscured field to the other service for de-obscuring of the different obscured field. Thus, the message relay service may determine whether it is authorized to de-obscure an obscured field and whether the plaintext data obtained through de-obscuring the obscured field can be disseminated to other entities that may receive the electronic message through the routing chain. In some instances, de-obscuring an obscured field may result in another obscured field or token that may be de-obscured by another service. Thus, the message relay service may obtain, through de-obscuring of an obscured field, another obscured field.

If the message relay service determines that de-obscuring of the one or more tokenized or encrypted fields of the electronic message is possible, the message relay service may perform 808 a workflow for de-obscuring these tokenized or encrypted fields. For example, the message relay service may obtain a cryptographic key or algorithm from its database and identified via the metadata included in the encrypted field to decrypt the encrypted field. This decryption may result in the replacement of the encrypted field with the decrypted data. As another example, if the electronic message includes a workflow data element comprising instructions for de-obscuring the tokenized fields of the electronic message, the message relay service may execute these instructions to de-obscure the tokenized fields, resulting in de-obscured data being presented in the electronic message.

The message relay service may also identify 810 the destination address for the electronic message. For instance, the message relay service may translate any electronic message address tokens specified in the tokenized electronic message into the actual contact address for the customer that is to receive the electronic message. The message relay service may refer to one or more databases that comprise key-value pairs corresponding to electronic message address tokens and contact addresses for customers and other targeted recipients of electronic messages. The message relay service may query the one or more databases to determine whether there is a key-value pair corresponding to the electronic message address token specified in the tokenized electronic message. If a key-value pair is identified, the message relay service may identify the corresponding contact address for the intended customer or other recipient and substitute the electronic message address token in the tokenized electronic message for the contact address to de-obscure the tokenized electronic message, resulting in the de-obscured electronic message. In some embodiments, the message relay service provides the tokenized electronic message to a database service once the obscured tokens included in the body of the tokenized electronic message have been de-obscured. The database service may de-obscure the electronic message address token to obtain the actual contact address for the customer or other recipient and may utilize the electronic message service or other private gateway (e.g., the database service is associated with a different service provider, such as the organization's own service provider or other authorized service provider) to deliver the electronic message to the intended recipient.

It should be noted that the destination address for the electronic message may correspond to a customer or to another service that may de-obscure any remaining obscured fields in the electronic message. For instance, in some embodiments, the message relay service can de-obscure some of the obscured fields in the tokenized electronic message. The destination address identified by the message relay service may correspond to another service that is authorized and capable of de-obscuring the remaining obscured fields in the electronic message.

If the message relay service has completed de-obscuring the tokenized and encrypted fields of the electronic message and has identified the destination address for the electronic message, the message relay service may transmit 812 the message to the electronic message service for delivery to the destination address. The customers of the organization utilizing the sender service may receive the electronic message from the electronic message service. In an embodiment, the electronic message service tracks delivery of the electronic messages to the customers to determine whether each electronic message is delivered successfully. Confirmation of delivery of the electronic messages may be transmitted by the electronic message service to the third-party mass delivery service, which may track success of the delivery of the electronic messages to the customers. The third-party mass delivery service may provide this information to the organization, which may use the information to determine the success of its campaign to deliver these electronic messages.

Figure 9:
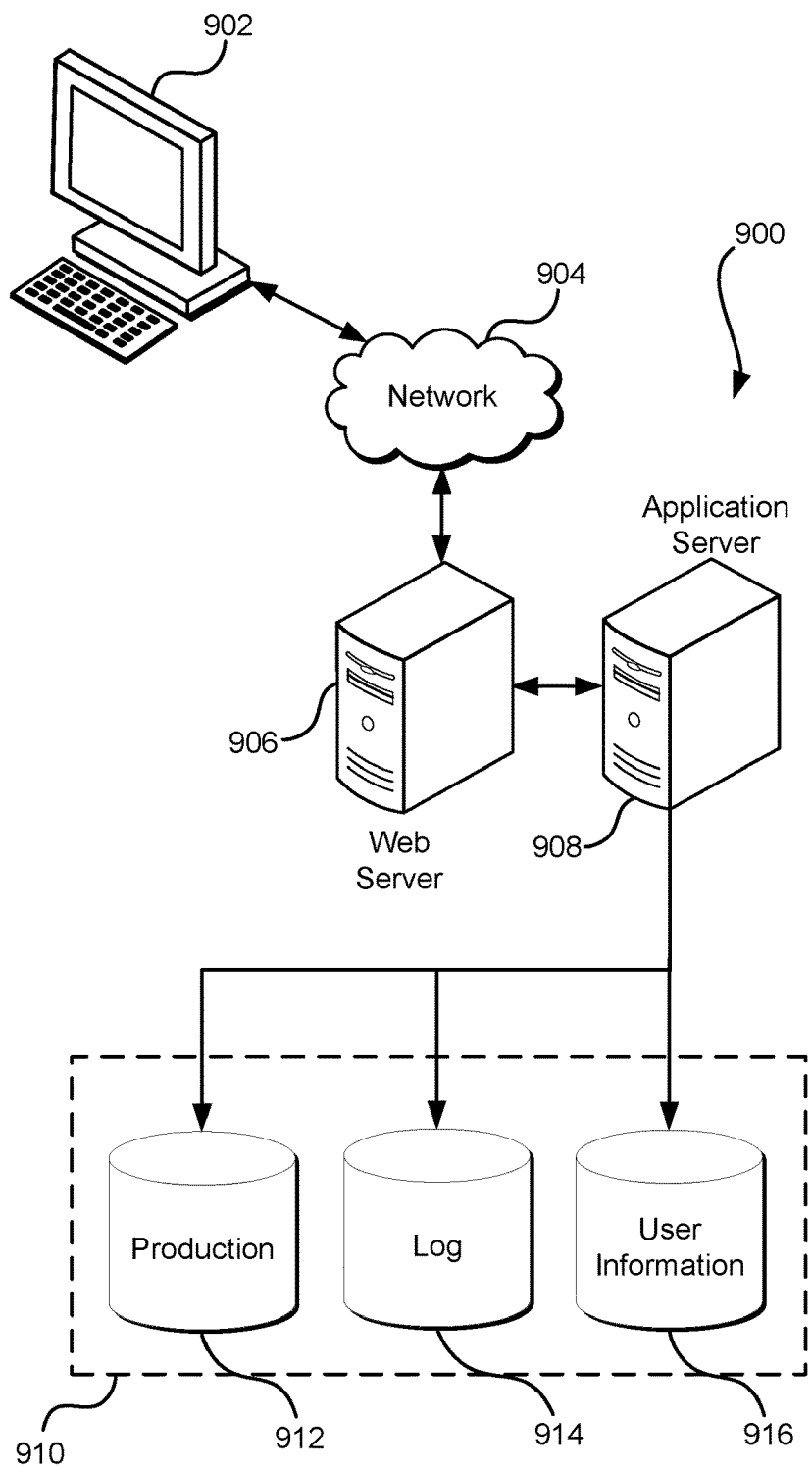
FIG. 9 shows an illustrative example of an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages, or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network, or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 902 and the application server 908, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes, and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update, or otherwise process data in response thereto. The application server 908 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as My SQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   generating an electronic message comprising a message body and specifying a current destination corresponding to a specified recipient of the electronic message;
   obscuring at least some of the message body resulting in obscured data, where plaintext data of the obscured data is unattainable by a third-party mass delivery service and the obscured data includes metadata that specifies one or more parameters for de-obscuring the obscured data;
   updating the current destination to correspond to an electronic message service that provides electronic messages to a message relay service for de-obscuring the obscured data to enable routing of the electronic message to the electronic message service;
   transmitting, via the third-party mass delivery service, the electronic message to the electronic message service; and
   providing, by the electronic message service, the electronic message to the message relay service, the message relay service:
      evaluating the metadata to identify the one or more parameters and a workflow data element for de-obscuring the obscured data, the workflow data element including a set of instructions for determining at least an address associated with the specified recipient and de-obscuring the obscured data;
      determining, based at least in part on the metadata, that the specified recipient is authorized to obtain the plaintext data;
      executing a subset of the instructions of the set of instructions included in the workflow data element to de-obscure the obscured data to obtain the plaintext data;
      updating, based at least in part on the address, the current destination to correspond to the specified recipient; and
      providing the electronic message to the electronic message service for delivery to the specified recipient.

2. The computer-implemented method of claim 1, wherein the metadata specifies an identifier for a cryptographic key usable by the message relay service to de-obscure the obscured data.

3. The computer-implemented method of claim 1, further comprising providing, to the third-party mass delivery service, confirmation of delivery of the electronic message to enable the third-party mass delivery service to indicate successful delivery of the electronic message to a sender of the electronic message.

4. The computer-implemented method of claim 1, wherein the workflow data element further comprises at least one parameter that, as a result of being executed by the message relay service, causes the message relay service to determine a cryptographic algorithm to use to de-obscure the obscured data.

5. A system, comprising at least one computing device with a processor configured to implement one or more services, wherein the one or more services are configured to:
receive; from an electronic message, from an electronic message service, an electronic message comprising obscured data and specifying a current destination corresponding to the electronic message service, where plaintext data of the obscured data is unattainable by a third-party mass delivery service;
obtain, from the electronic message, a workflow data element comprising a set of parameters for de-obscuring the obscured data;
cause a message relay service to de-obscure at least one obscured field in the electronic message to obtain a plaintext data field by at least utilizing a first parameter of the set of parameters to de obscure the at least one obscured field to obtain the plaintext data field;
update the current destination to correspond to a specified recipient, by at least utilizing a second parameter of the set of parameters to determine the specified recipient; and
cause the electronic message including the plaintext data field to be transmitted to the specified recipient.

6. The system of claim 5, wherein:
the at least one obscured field includes metadata specifying an identifier for a cryptographic key utilized to encrypt the plaintext data to generate the at least one obscured field; and
the one or more services are further configured to:
obtain the cryptographic key; and
utilize the cryptographic key to decrypt the at least one obscured field to obtain the plaintext data field.

7. The system of claim 5, wherein de-obscuring the at least one obscured field includes:
evaluating the at least one obscured field to identify a service that can de-obscure the at least one obscured field, the service being authorized to utilize the plaintext data field;
transmitting the at least one obscured field to the service; and
obtaining, from the service, the plaintext data, field.

8. The system of claim 5, wherein the one or more services are further configured to:
obtain a set of data loss prevention rules to determine that the electronic message includes data that cannot be disseminated to the specified recipient; and
redact the data that cannot be disseminated.

9. The system of claim 5, wherein:
the obscured field includes a digital signature of a service that generated the electronic message; and
the one or more services are further configured to:
transmit a request to a service that generated the electronic message to obtain a digital certificate usable to verify the digital signature of the Obscured field;
obtain the digital certificate; and
utilize the digital certificate to determine that the digital signature is authentic and to de-obscure the obscured field.

10. The system of claim 5, wherein the one or more services are further configured to:
determine that the electronic message was delivered to the specified recipient successfully; and
transmit a notification to the third-party mass delivery service indicating a delivery state of the electronic message to the specified recipient.

11. The system of claim 5, wherein the one or more services are further configured to query a database using at least the second parameter, the database specifying electronic addresses for the electronic message service and electronic addresses for recipients to identify an electronic address for the specified recipient that can be used as the current destination.

12. The system of claim 5, wherein the workflow data element further comprises an eXtensible Markup Language (XML) data object.

13. A non-transitory computer-readable storage medium storing executable instructions that, as a result of being executed by one or more processors of a computer system, cause the computer system to at least:
obtain an electronic message comprising obscured data, lookup information, and specifying a current destination corresponding to the computer system, where plaintext data of the obscured data is unattainable by a third-party mass delivery service;
utilize the lookup information to obtain a set of parameters specifying a set of operations for de-obscuring at least a portion of the obscured data;
de-obscure, at a message relay service, at least the portion of the obscured data to obtain a first portion of plaintext data based at least in part on a first parameter of the set of parameters;
update the current destination to correspond to a specified recipient based at least in part on a second parameter of the set of parameters; and
enable delivery of the electronic message to the specified recipient.

14. The non-transitory computer-readable storage medium of claim 13, wherein the instructions further cause the computer system to:
determine that the electronic message has been delivered to the specified recipient; and
transmit a notification to the third-party mass delivery service to indicate a delivery state of the electronic message to cause the third-party mass delivery service to provide the delivery state to a sender of the electronic message regarding delivery of the electronic message.

15. The non-transitory computer-readable storage medium of claim 13, wherein the instructions that cause the computer system to update the current destination to correspond to the specified recipient further cause the computer system to:
query a database service comprising one or more databases specifying recipient electronic addresses corresponding to current destinations to identify an electronic address for the specified recipient, the query including the second parameter; and receive, from the database service, the electronic address for the specified recipient to cause the computer system to correspond the current destination to the electronic address for the specified recipient.

16. The non-transitory computer-readable storage medium of claim 13, wherein the instructions further cause the computer system to:
identify one or more data loss protection rules prohibiting dissemination of a subset of data;
determine that the electronic message includes the subset of data; and
redact the subset of data from the electronic message.

17. The non-transitory computer-readable storage medium of claim 13, wherein the instructions that cause the computer system to de-obscure the obscured data to obtain the first portion of plaintext data further cause the computer system to:
identify an authorized service that can de-obscure the obscured data;
transmit a request to the authorized service to de-obscure the obscured data, the request including the obscured data; and
obtain the first portion of plaintext data from the authorized service.

18. The non-transitory computer-readable storage medium of claim 13, wherein the instructions that cause the computer system to dc-obscure the obscured data to obtain the first portion of plaintext data further cause the computer system to:
evaluate metadata of the obscured data to identify a cryptographic algorithm for de-obscuring the obscured data; and
execute the cryptographic algorithm to de-Obscure the obscured data.

19. The non-transitory computer-readable storage medium of claim 13, wherein:
the obscured data further comprises a workflow data element indicating the set of parameters for dc-obscuring the obscured data, the set of parameters being unattainable by the third-party mass delivery service.

20. The non-transitory computer-readable storage medium of claim 13, wherein the instructions further cause the computer system to transmit a request to an electronic message service to transmit the electronic message to the specified recipient, the request including the electronic message and the first portion of plaintext data, and specifying the current destination.

* * * * *